United States Patent [19]

Hirano et al.

[11] Patent Number: 5,274,787
[45] Date of Patent: Dec. 28, 1993

[54] METHOD OF COPY-BACK CACHE COHERENCE CONTROL AND TIGHTLY COUPLED MULTI-PROCESSOR SYSTEM WITH SPLIT TRANSFER SYSTEM BUS

[75] Inventors: Masanori Hirano, Iruma; Akira Mori, Yokosuka, both of Japan

[73] Assignee: Nippon Telegraph & Telephone Corp., Japan

[21] Appl. No.: 642,395

[22] Filed: Jan. 17, 1991

[30] Foreign Application Priority Data

Jan. 19, 1990 [JP] Japan .................................. 2-10304

[51] Int. Cl.⁵ .................................................. G06F 12/08
[52] U.S. Cl. ................................ 395/425; 364/DIG. 1
[58] Field of Search ... 364/200 MS File, 400 MS File; 395/400 MS File, 425 MS File

[56] References Cited

U.S. PATENT DOCUMENTS

| 4,648,030 | 3/1987 | Bomba et al. | 395/425 |
|---|---|---|---|
| 4,706,190 | 11/1987 | Bomba et al. | 395/325 |
| 4,787,033 | 11/1988 | Bomba et al. | 395/325 |
| 4,794,521 | 12/1988 | Ziegler et al. | 395/425 |
| 4,843,542 | 6/1989 | Dashiell et al. | 395/425 |
| 5,025,365 | 6/1991 | Mathur et al. | 395/600 |
| 5,025,366 | 6/1991 | Baror | 395/425 |

OTHER PUBLICATIONS

Cache Coherency Protocol for Tightly Coupled Multiprocessor with Split Bus; Spring National Meeting of Electronic Information Communication Society (Mar. 1990); NTT Communications and Information Processing Laboratories. A translation is provided.

Cache Coherence Protocols: Evaluation Using a Multiprocessor Simulation Model; Association for Computing Machinery; ACM Transactions on Computer Systems, vol. 4, No. 4, Nov. 1986, pp. 273-298.

TRON Project 1990; Open-Architecture Computer Systems; Proceedings of the Seventh TRON Project Symposium; Ken Sakamura (ED.). Springer-Verlag, 1990.

Primary Examiner—Joseph L. Dixon
Assistant Examiner—Reba I. Elmorz
Attorney, Agent, or Firm—Wigman, Cohen, Leitner & Myers

[57] ABSTRACT

A method of achieving consistent cache coherence control in a tightly coupled multi-processor system with a plurality of processors having copy-back cache memories and a shared memory connected by a split transfer system bus. In this method, the cache memory data management is accomplished by using cache memory states for labelling each data entry in the cache memories, the cache memory states including at least one transient state for awaiting data transfer after a corresponding address transfer, and access is prohibited to data which is in the transient state in one cache memory by a processor other that the processor associated with this one cache memory.

10 Claims, 7 Drawing Sheets

METHOD OF COPY-BACK CACHE COHERENCE CONTROL AND TIGHTLY COUPLED MULTI-PROCESSOR SYSTEM WITH SPLIT TRANSFER SYSTEM BUS

BACKGROUND OF THE INVENTION

1. Field of the Invention

The present invention relates to a cache coherence control in a tightly coupled multi-processor system in which a plurality of processors and memories are coupled by data and address bus.

2. Description of the Background Art

A tightly coupled multi-processor system, in which a plurality of processors and memories are coupled by data and address buses, is known to have a superior expansion capability. However, there is also a problem in such a system that as the number of processors increases the improvement of system throughput becomes difficult because of the increasing bus traffic.

In order to improve the system throughput by reducing the bus transfer, it is therefore necessary to reduce memory access frequency and to improve bus throughput.

As a method of reducing the memory access frequency, it has been proposed to provide a cache memory for each processor and to control the cache memories by copy-back type control.

An example of such a tightly coupled multi-processor system is shown in FIG. 1, where the system comprises processors 1 and 2 including CPUs 3 and 4, respectively, and cache memories 5 and 6, respectively; a shared memory 7; and a bus 8 for connecting the processors 1 and 2 and the shared memory 7.

In this type of the system which incorporates the cache memories 5 and 6, there is a need for maintaining the data coherence among the cache memories 5 and 6 and the shared memory 7, which is furnished in the form of a cache coherence protocol.

Conventionally, various propositions have been made for such a cache coherence protocol using copy-back type cache memories. The conventional cache coherence protocols are summarized by James Archibald and Jean-Loup Baer in "Cache Coherence Protocols: Evaluation Using a Multiprocessor Simulation Model", ACM Transactions on Computer Systems, Vol, 4, No. 4, November 1986, pp. 273-298.

The Write-Once protocol is one example of a conventional cache coherence protocol. A state transition diagram for the Write-Once protocol is shown in FIG. 2, where updating of the cache memory data takes place in a unit of a data block, and I, S, P, and P' represent four states of the cache memory data block to be described in detail below, while a solid line indicates a processor-based transition, i.e., a transition triggered by access made by the respective CPU and the state of the respective cache memory data block, and a dashed line indicates a bus induced transition, i.e., a transition triggered by access through the bus due to access made by another CPU and the state of another cache memory data block. In this Write-Once protocol, data coherence among the cache memories and shared memory is maintained by managing cache memory data by using the following four block states:

(1) I: invalid (2) P: the data of the block do not exist in the cache memory of the other processor, and the data coincide with those in the shared memory;

(3) P': the data of the block do not exist in the cache memory of the other processor, and the data do not coincide with those in the shared memory; and (4) S: the data of the block exist in the cache memory of the other processor, and the data coincide with those in the shared memory.

On the other hand, as a method of bus control, two types of bus control include:

(1) split transfer method: a method in which the bus is released between the data read command (address transfer) cycle and the data transfer cycle; and (2) interlock transfer method: a method in which the bus is locked between the data read command (address transfer) cycle and the data transfer cycle.

Compared with the interlock transfer method, the split transfer method requires more complicated controlling but is capable of obtaining higher throughput so that it is more suitable for the system bus in the tightly coupled multi-processor system.

The conventional data coherence protocols such as the Write-Once protocol described above can operate perfectly well when the interlock transfer bus is used. However, when the split transfer bus is used, inconsistency arises in the conventional data coherence protocols.

Namely, when the split transfer bus is used along with the conventional data coherence protocols, the situation depicted in FIG. 3 may arise as follows. First, at (1) the data block required by the CPU of processor #i does not exist in the cache memory of processor #i, so that processor #i makes a block read command to the shared memory, i.e., address transfer from processor #i to the system bus takes place. Then, at (2) processor #i changes the state of its cache memory from I to S, assuming that the block exists in the cache memory of another processor #j. After that, at (3) processor #j makes a write access to the same address. Here, because the state of the cache memory of processor #j is S, processor #j transfers the write address and data to the bus. Next, at (4) processor #i monitors the bus and recognizes the write address by processor #j, so that the state of the cache memory of the processor #i is changed from S to I again, according to the cache coherence protocol. Then after that at (5), the data block from the shared memory is transferred to processor #i. Because the state of the cache memory of the processor #i is I, however, the transferred data block cannot be registered into the cache memory of processor #i, and inconsistency in the cache management occurs.

In this manner, the conventional data coherence protocol generates an inconsistency when access to a certain address from another processor is generated during a period between the address transfer cycle and the data transfer cycle related to that certain address.

SUMMARY OF THE INVENTION

It is therefore an object of the present invention to provide a method of cache coherence control capable of achieving a consistent cache coherence control, by using a split transfer bus and copy-back cache memories.

It is also an object of the present invention to provide a tightly coupled multi-processor system with improved system performance.

According to one aspect of the present invention there is provided a method of copy-back cache coherence control in a tightly coupled multi-processor system using a plurality of processors having copy-back cache memories and a shared memory connected by a split transfer system bus, comprising the steps of: managing the data in the cache memories by using cache memory states for labelling each data entry in the cache memories, the cache memory states including at least one transient state for waiting for a data transfer after a corresponding address transfer; and prohibiting access to data which are in the transient state in one cache memory by a processor other than a processor associated with said cache memory.

According to another aspect of the present invention there is provided a tightly coupled multi processor system, comprising: a plurality of processors, each processor including: a copy back cache memory, each data entry of the cache memory being labelled by one cache memory state of plural cache memory states including at least one transient state for waiting for a data transfer after a corresponding address transfer; and means for managing the data on the cache memory by using the cache memory states, which managing means prohibits access to data which are in the transient state in the cache memory, by another processor; a shared memory for storing the data to be accessed by the processors; and a split transfer system bus for connecting the processors.

Other features and advantages of the present invention will become apparent from the following description taken in conjunction with the accompanying drawings.

DETAILED DESCRIPTION OF THE PREFERRED EMBODIMENTS

According to the present invention, copy-back cache coherence is controlled by new transient states of waiting for the transfer of a data block after an address for said data block is sent to the system bus, i.e., states of a pending block read command, such that access from another processor to said address of said data block is prohibited in such transient states, so as to prevent the occurrence of inconsistency among the cache data with a high throughput split transfer bus. The prohibition of access from another processor to the address of that data block can be effectively realized by providing a retry signal to said other processor attempting access to the address of that data block.

Figure 1:
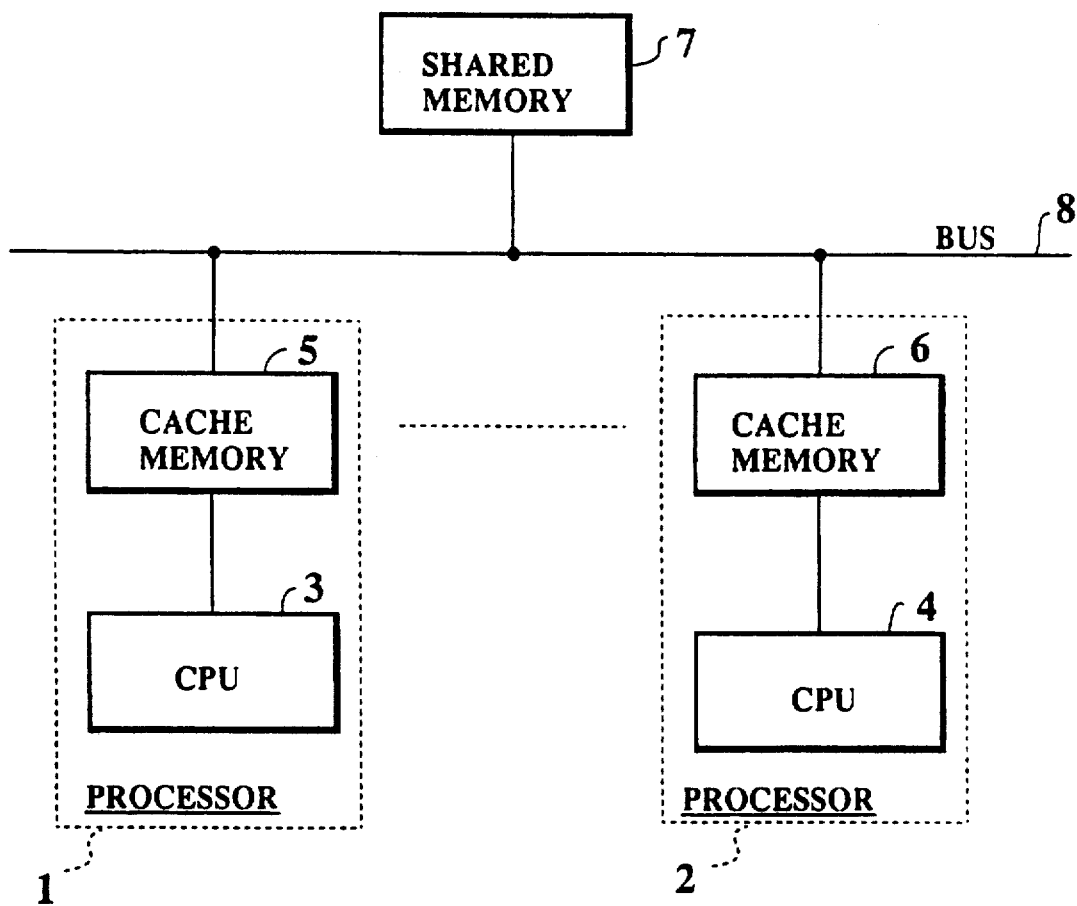
FIG. 1 is a schematic block diagram of a conventional tightly coupled multi-processor system with cache memories.
Figure 2:
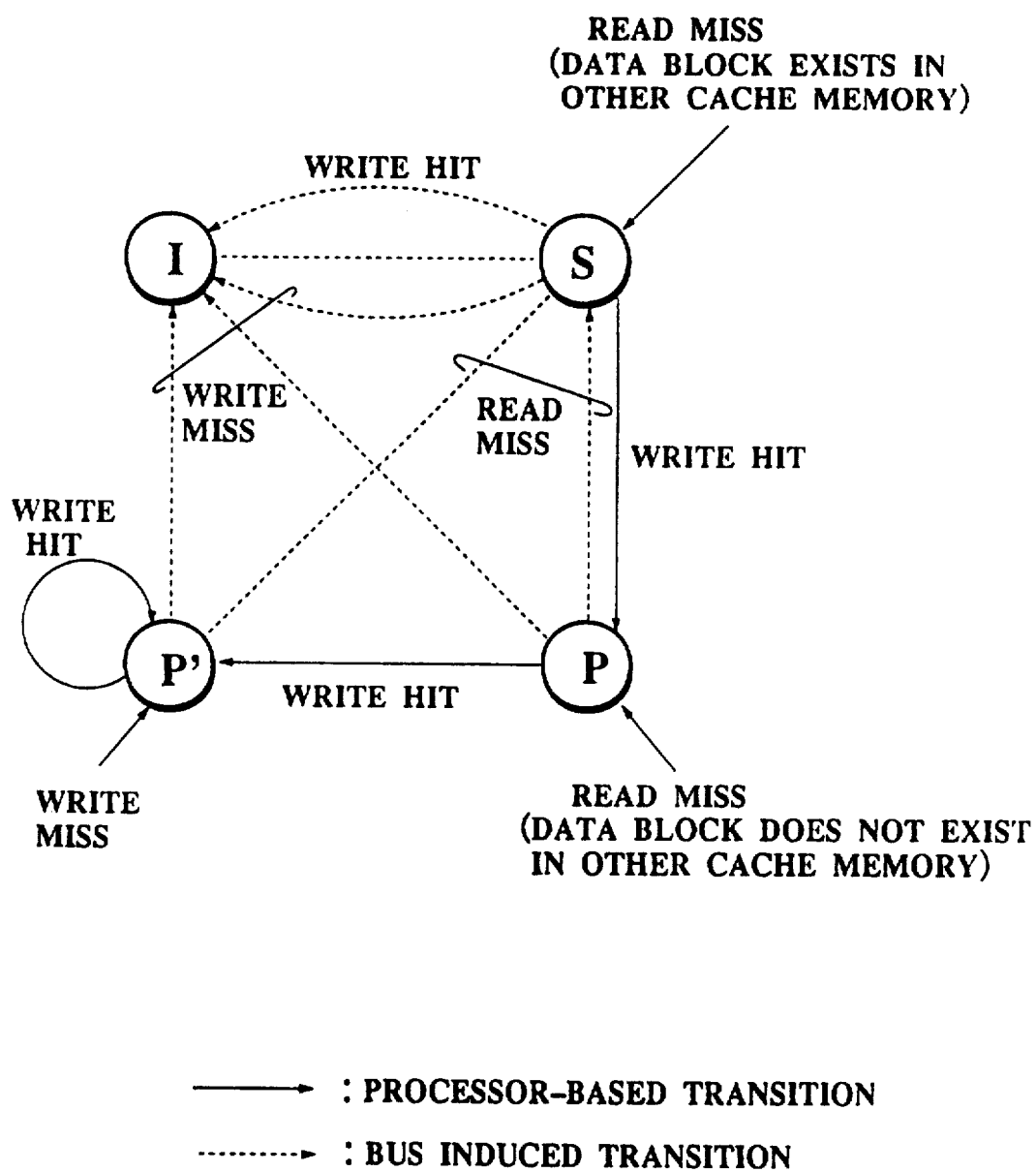
FIG. 2 is a diagram of a state transition for the conventional "Write-Once" cache coherence protocol.
Figure 3:
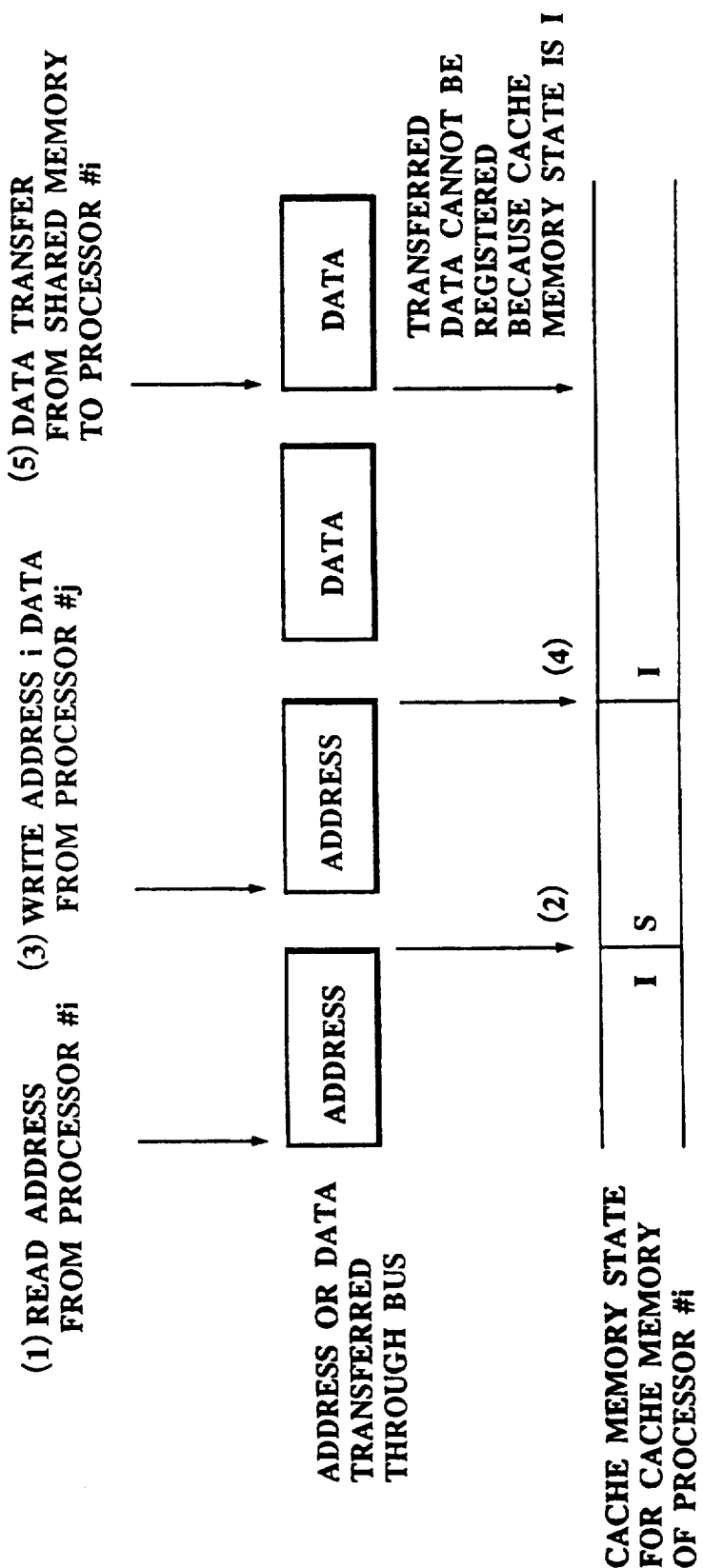
FIG. 3 is a diagram of sequential states of the cache memory, for explaining an inconsistency arising in the conventional cache coherence protocol.
Figure 4:
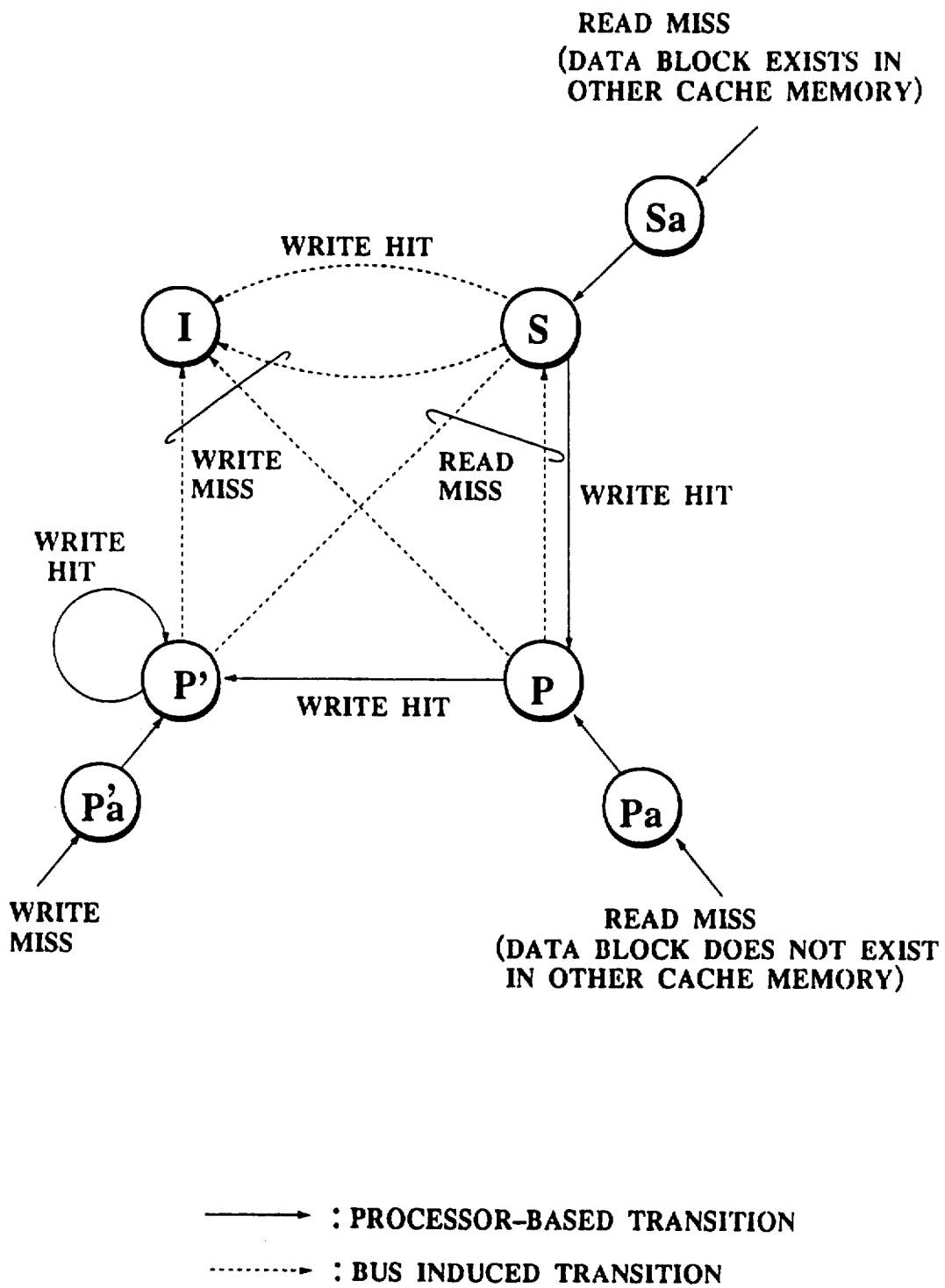
FIG. 4 is a diagram of a state transition for a cache coherence protocol used in one embodiment of a method of copy-back cache coherence control according to the present invention.

More specifically, in one embodiment of a copy-back cache coherence control according to the present invention, a cache coherence protocol implementing a state transition diagram shown in FIG. 4 is used.

In FIG. 4, updating of the cache memory data takes place in a unit of a data block, and I, S, Sa, P, Pa, P', and P'a represent seven states of the cache memory data block to be described in detail below, while a solid line indicates a processor-based transition, i.e., a transition triggered by access by the respective CPU and the state of the respective cache memory data block, while a dashed line indicates a bus induced transition, i.e., a transition triggered by access through the bus due to access by another CPU and the state of another cache memory data block. In this copy-back cache coherence protocol, data coherence among the cache memories and the shared memory is maintained by managing cache memory data using seven block states.

(1) I: invalid;
(2) P: the data of the block do not exist in the cache memory of the other processor, and the data coincide with those in the shared memory;
(3) P': the data of the block do not exist in the cache memory of the other processor, and the data do not coincide with those in the shared memory;
(4) S: the data of the block exist in the cache memory of the other processor, and the data coincide with those in the shared memory;
(5) Pa: the block read command for the data block is generated in state P (2) above, and the transfer of the data block is awaited; and
(6) P'a: the block read command for the data block is generated in state P' (3) above, and the transfer of the data block is awaited; and
(7) Sa: the block read command for the data block is generated in state S (4) above, and the transfer of the data block is awaited.

Among these seven states, states (1) to (4) (I, P, P', and S) are identical to the four states used in the conventional Write-Once protocol, while states (5) to (7) (Pa, P'a, and Sa) are new transient states.

Figure 5:
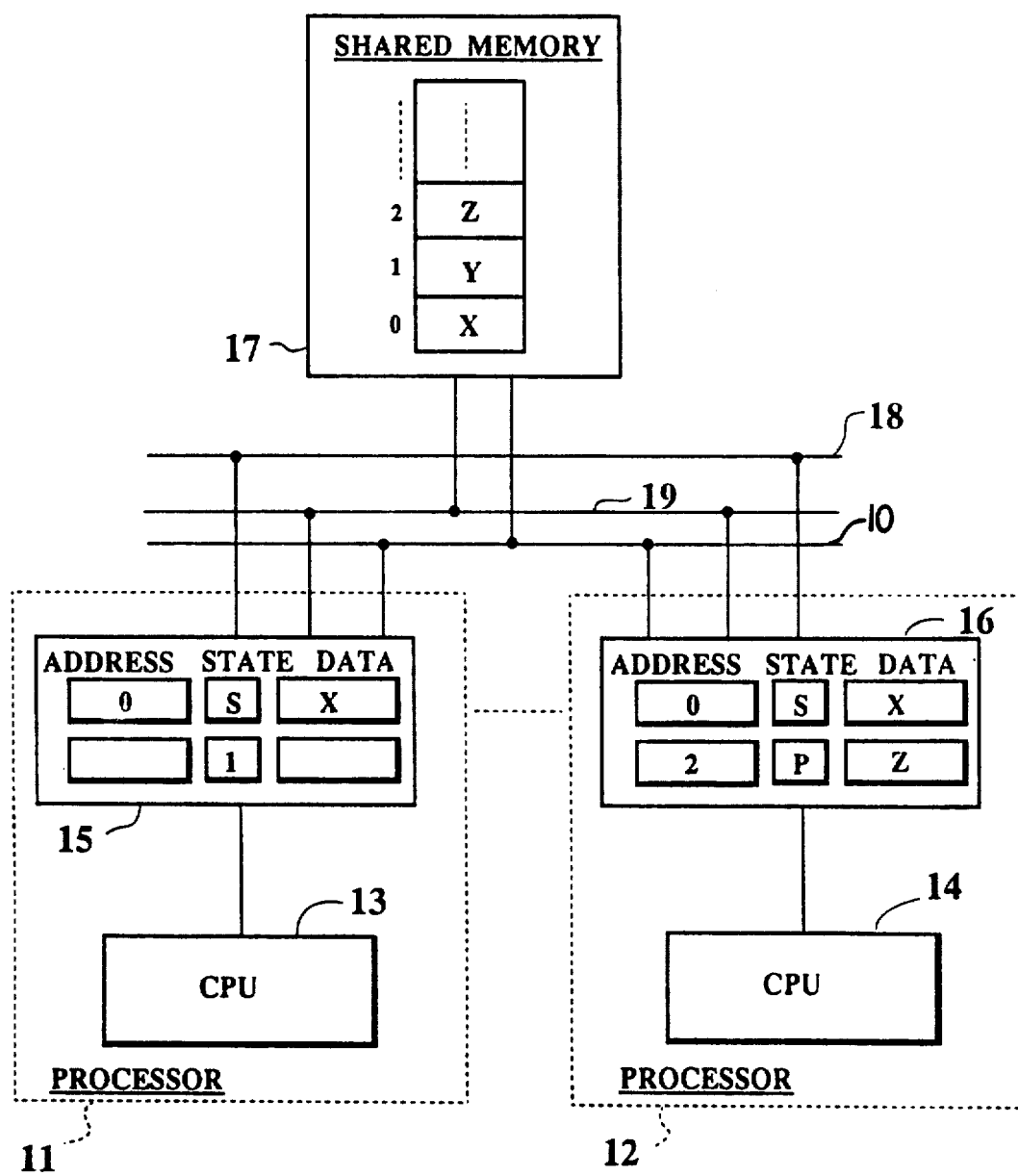
FIG. 5 is a schematic block diagram of one embodiment of a tightly coupled multi-processor system with a split transfer system bus and copy-back cache memories according to the present invention.

This copy-back cache coherence control can be realized by a tightly coupled multi-processor system with a split transfer system bus and copy-back cache memories having the configuration shown in FIG. 5. This system comprises: processors 11 and 12 including CPU's 13 and 14, respectively, and corresponding cache memories 15 and 16, respectively; a shared memory 17; a split transfer system bus 18 for connecting the processors 11 and 12 and the shared memory 17 by using the split transfer method; a cache state signal line 19 for transmitting cache state signals indicating states of cache memories 15 and 16; and a retry signal line 10 for transmitting the aforementioned retry signals.

In this system, when the data block to be accessed for a read operation by the CPU 13 of the processor 11 (or CPU 14 of the processor 12) does not exist in the associated cache memory 15 (or cache memory 16), i.e., the case of a read miss, the address of the block read command is sent to the system bus 18.

An entry for this data block to be accessed for a read operation is then stored in the cache memory 15 (or cache memory 16) with one of the seven states described above. When the data block to be accessed for a read operation exists in the other cache memory 16 (or cache memory 15) of the other processor 12 (or processor 11), the entry is stored with state Sa, whereas when the data block to be accessed for a read operation does not exist in the other cache memory 16 (or cache memory 15) of the other processor 12 (or processor 11), the entry is registered with state Pa.

When the data block to be accessed for a read operation does not exist in the other cache memory 16 (or cache memory 15) of the other processor 12 (or processor 11) with state P'a, the data block to be accessed for a read operation is then transferred from the shared memory 17, whereas when the data block to be accessed for a read operation exist in the other cache memory 16 (or cache memory 15) of the other processor 12 (or processor 11) with state P'a, the data block to be accessed for a read operation is transferred from this cache memory 16 (or cache memory 15) of the other processor 12 (or processor 11).

When the data block to be accessed for a read operation is received through the system bus 18 and stored in the prepared entry in the cache memory 15 (or cache memory 16), the state of the entry is then changed from Sa to S, or from Pa to P.

On the other hand, when the data block to be accessed for a write operation by the CPU 13 of the processor 11 (or CPU 14 of the processor 12 does not exist in the associated cache memory 15 (or cache memory 16), i.e., in case of a write miss, the address of the block read command is sent to the system bus 18.

An entry for this data block to be accessed for a write operation is then stored in the cache memory 15 (or cache memory 16) with state P'a.

When the data block to be accessed for a write operation does not exist in the other cache memory 16 (or cache memory 15) of the other processor 12 (or processor 11) with state P'a, the block to be accessed for a write operation is then transferred from the share memory 17, whereas when the data block to be accessed for a write operation exists in the other cache memory 16 (or cache memory 15) of the other processor 12 (or processor 11) with state P'a, the data block to be accessed for a write operation is transferred from this cache memory 16 (or cache memory 15) of the other processor 12 (or processor 11).

When the data block to be accessed for a write operation is received through the system bus 18 and registered in the prepared entry in the cache memory 15 (or cache memory 16), the state of the entry is then changed from P'a to P'.

Thus, in this embodiment, the data in the cache memories 15 and 16 are managed by using the transient states Sa, Pa, and P'a during the period of a pending block read command, from the time of address transfer until the time of the data block transfer, and such management prevents the occurrence of inconsistency among the cache data by prohibiting access from the other processor to address the data block stored with the transient states.

A concrete example of the operation of this copyback cache coherence control will now be described.

In the example shown in FIG. 5, each of the cache memories 15 and 16 has two block entries: each block entry includes areas for storing an address in the shared memory 17 of the data block, a state of the block entry, and data of the data block.

The shared memory 17 has data "X", "Y", "Z", and so on at addresses "0", "1", "2", and so on, respectively. In one block entry of the cache memory 15 of the processor 11, data "X" of address "0" in the shared memory 17 are stored with state S, while the other block entry of this cache memory 15 is empty and has state I. On the other hand, in one block entry of the cache memory 16 of the processor 12, data "X" of the address "0" in the shared memory 17 are stored with state S, while in the other block entry of this cache memory 16, the data "Z" of the address "2" in the shared memory 17 are stored with state P.

Consider now the case in which the CPU 13 of the processor 11 generates a block read command for the data block of address "2". Since this data block of address "2" is in the associated cache memory 15, the processor 11 acquires the system bus 18, and transmits address "2" through the system bus 18 to the shared memory 17 and the other processor 12. In response, the shared memory 17 starts reading the data of the address "2". Meanwhile, as the cache memory 16 of the other processor 12 has the data block of address "2", the processor 12 changes the state of the block entry having the data block of address "2" from P to S, and signals the presence of the data block with state S by transmitting a cache state signal through the cache state signal line 19. In response to this cache state signal, the cache memory 15 of the processor 11 changes the state of the entry block from state I to Sa, stores address "2" in this entry, and releases the system bus 18.

Suppose the CPU 14 of the processor 12 then generates the write command for changing the data of address "0" from "X" to "x" in this situation. In such case, the data of address "0" is changed from "X" to "x" in the cache memory 16 of the processor 12, because the state of this block entry for the data of address "0" is S in the cache memory 16, when the processor 12 acquires the system bus 18 and transmits address "0" and the corresponding data "x" through the system bus 18 to the cache memory 15 of the processor 11 and the shared memory 17. In response, the shared memory 17 updates the data of address "0" from "X" to "x", while the state of the block entry for the data of address "0" in the cache memory 15 of the processor 11 is changed from S to I, so as to invalidate the old data "X".

Suppose the CPU 14 of the processor 12 then generates the write command for changing the data of the address "2" from "Z" to "z" in this situation. In such case, when the data of address "2" is changed from "Z" to "z" in the cache memory 16 of the processor 12, because the state of this block entry for the data of address "2" is now S in the cache memory 16, the processor 12 acquires the system bus 18 and transmits address "2" and the corresponding data "z" through the system bus 18 to the cache memory 15 of the processor 11 and the shared memory 17. Here, however, the cache memory 15 of the processor 11 has the block entry for the data of the address "2" with transient state Sa, so that the processor 11 transmits a retry signal through the retry signal line 10 to the processor 12 and the shared memory 17, such that updating the data of address "2" in the shared memory 17 is prohibited, and the processor 12 releases the system bus 18 and prepares to retry updating of data of the address "2".

Suppose the reading of the data of the address "2" at the shared memory 17 in response to the block read command from the processor 11 is then completed in this situation. In such case, the shared memory 17 acquires the system bus 18 and transmits the data of address "2" through the system bus 18 to the cache memory 15 of the processor 11. The cache memory 15 stores the transmitted data into the block entry for the data of address "2", and changes the state of this block entry from Sa to S.

The processor 12 then acquires the system bus 18 again and transmits the address "2" and the corresponding data "z" through the system bus 18 to the cache memory 15 of the processor 11 and the shared memory 17. Here, now, the cache memory 15 of the processor 11 has the block entry for the data of address "2" with state S, so that the processor 11 changes the state of this block entry from S to I in order to validate the old data "Z", without generating the retry signal. Also, because of the absence of the retry signal in the retry signal line 10, the shared memory 17 updates the data of address "2" from "Z" to "z".

Figure 6:
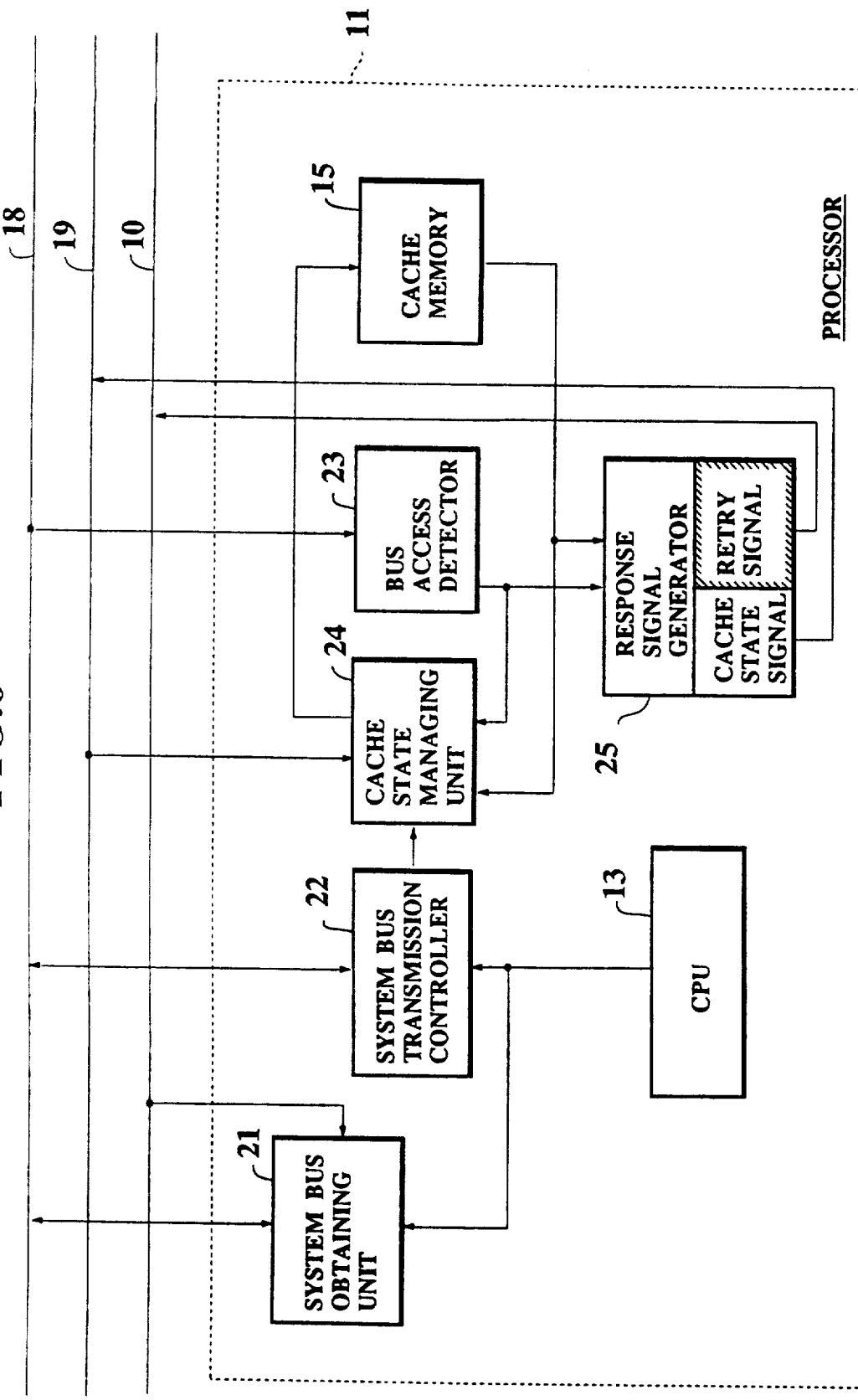
FIG. 6 is a block diagram of a processor in the tightly coupled multi-processor system of FIG. 5.

To realize the operation described above, each of the processors 11 and 12 has a configuration as shown in FIG. 6 for the case of processor 11.

In addition to the CPU 13 and the cache memory 15 already mentioned above, the processor 11 further includes: a system bus acquisition unit 21 for accessing the system bus 18 in response to control by the CPU 13; a system bus transmission controller 22 for controlling transmission of the address and data through the system bus 18 in response to an access command from the CPU 13; a bus access detector 23 for detecting acquisition of the system bus 18 by the other processor; a cache state managing unit 24 for managing the states of block entries in the cache memory 15 in accordance with the cache state signals from the cache state signal line 19, the currently registered states of the block entries in the cache memory 15, and outputs from the system bus transmission controller 22 and the bus access detector 23; and a response signal generator 25 for generating the retry signal when the state of the relevant block entry in the cache memory 15 is one of the transient states (Sa, Pa, and P'a), and for generating the cache state signal otherwise.

Figure 7:
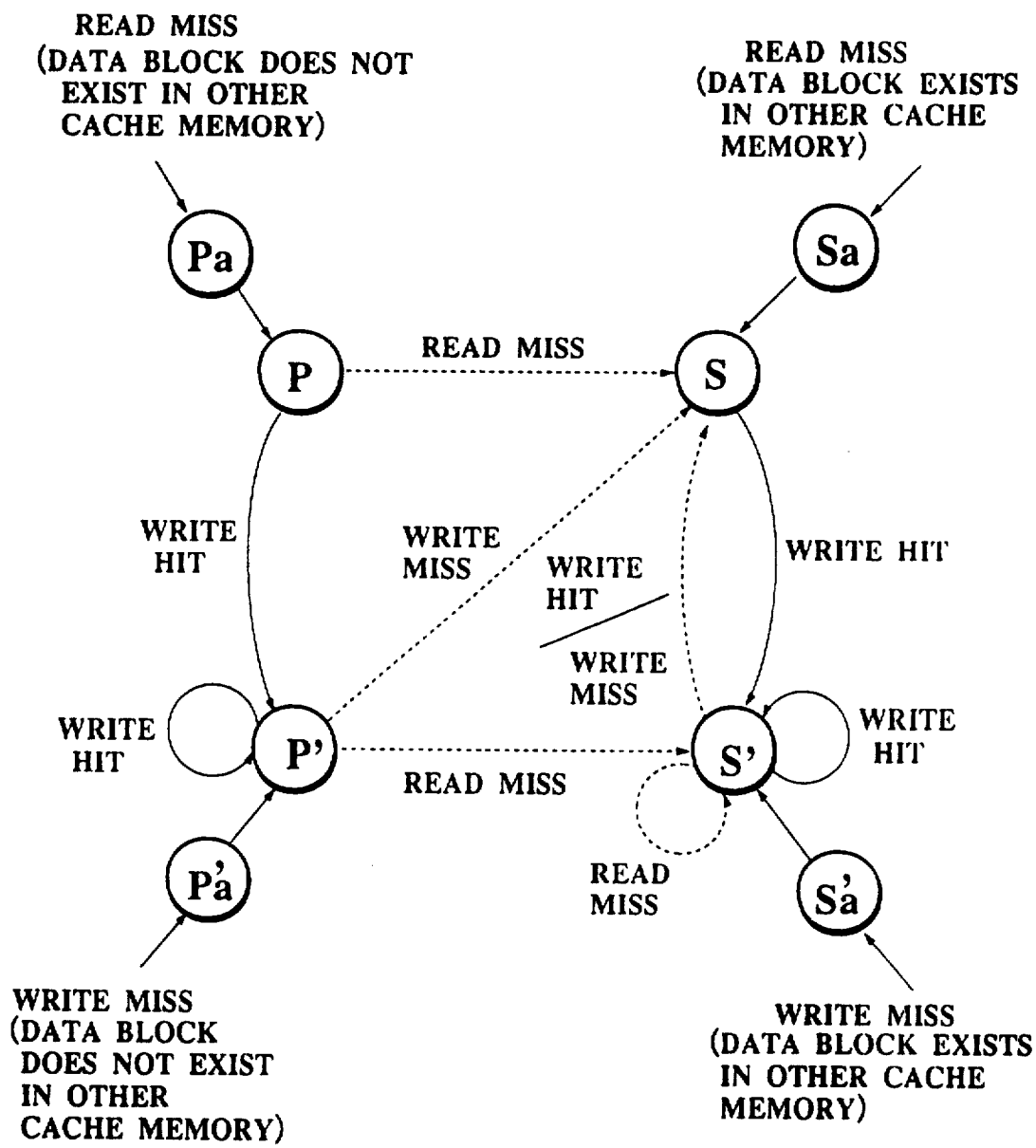
FIG. 7 is a diagram of a state transition for a cache coherence protocol used in another embodiment of a method of copy-back cache coherence control according to the present invention.

Referring now to FIG. 7, another embodiment of a copy-back cache coherence control according to the present invention will be described.

In this embodiment, a cache coherence protocol implementing a state transition diagram as shown in FIG. 7 is used.

In the state transition diagram of FIG. 7, updating of the cache memory data takes place in a unit of a data block, and I, S, Sa, S', S'a, P, Pa, P', and P'a represent nine states of the cache memory data block to be described in detail below. A solid line indicates a processor-based transition, i.e., a transition triggered by the access made by the own CPU and the state of the own cache memory data block, while a dashed line indicates a bus induced transition, i.e., a transition triggered by access through the bus due to an access made by the other CPU and the state of the other cache memory data block. In this copy-back cache coherence protocol, the data coherence among the cache memories and the shared memory is maintained by managing the cache memory data using the following nine states of block.

(1) I: invalid;
(2) P: the data of the block do not exist in the cache memory of the other processor, and the data coincide with those in the shared memory;
(3) P': the data of the block do not exist in the cache memory of the other processor, and the data do not coincide with those in the shared memory;
(4) S: the data of the block exist in the cache memory of the other processor, and the data coincide with those in the shared memory;
(4') S': the data of the block exist in the cache memory of the other processor, and the data do not coincide with those in the shared memory;
(5) Pa: the block read command for the data block is generated in state P of (2) above, and the transfer of the data block is awaited;
(6) P'a: the block read command for the data block is generated in state P' of (3) above, and the transfer of the data block is awaited;
(7) Sa: the block read command for the data block is generated in state S of (4) above, and the transfer of the data block is awaited; and
(7') S'a: the block read command for the data block is generated in state S' of (4') above, and the transfer of the data block is awaited.

Among these nine states, the states (1) to (4) (I, P, P', S, S') and (5) to (7) (Pa, P'a, Sa, S'a) are identical to the seven states used in the previous embodiment, and the new states (4') and the corresponding new transient state (7') are added to these seven states in this embodiment.

This copy-back cache coherence control can also be realized by a tightly coupled multi-processor system with a split transfer system bus and copy-back cache memories having the configuration shown in FIG. 5, using the processors having configuration details as shown in FIG. 6. The operation proceeds in a manner similar to that described above for the previous embodiment, except that the operation involves nine states in this embodiment, instead of seven states in the previous embodiment.

It is noted that although the preferred embodiments are described above for a case of using only two processors for the sake of simplicity, the present invention is equally applicable to any multi-processor system using any number of processors.

It is also noted that although only two preferred embodiments using seven states and nine states are described above, the present invention is not limited by the number of states used, as at least one transient state is used.

Moreover, it is to be noted that known cache coherence protocols can be modified according to the present invention to include one or more transient states to obtain the same benefits described for the above preferred embodiments.

Many other such modifications and variations of the above embodiments may be made without departing from the novel and advantageous features of the present invention. Accordingly, all such modifications and variations are intended to be included within the scope of the appended claims.

What is claimed is:

1. A method of copy-back cache coherence control in a tightly coupled multi-processor system having a shared memory and each processor having a copy-back cache memory, wherein the shared memory and each processor are connected to a split transfer system bus, comprising the steps of:
    managing data in the copy-back cache memories by using cache memory states for labelling each data entry in the copy-back cache memories, the cache memory states including the following seven states:
(1) a state in which the data to be accessed is invalid;
(2) a state in which the data to be accessed does not exist in the copy-back cache memory of a different processor, and the data coincides with that in the shared memory;
(3) a state in which the data to be accessed does not exist in the copy-back cache memory of a different processor and the data does not coincide with that in the shared memory;
(4) a state in which the data to be accessed exists in the copy-back cache memory of a different processor, and the data coincides with that in the shared memory;
(5) a transient state in which a data read command is generated for the data stored in a data entry in the state (2), and the transfer of the data is awaited;
(6) a transient state in which a data read command is generated for the data stored in a data entry in the state (3), and the transfer of the data is awaited; and
(7a transient state in which a data read command is generated for the data stored in a data entry in the state (4), and the transfer of the data is awaited; and
prohibiting an access to data stored in a data entry in any one of the transient states in one of the copy-back cache memories, by a processor other than a processor issuing the data read command which causes the transient state.

2. The method of claim 1, further comprising a step of transmitting a retry signal to indicate a prohibition of an access to data stored in a data entry in any one of the transient states in one of the copy-back cache memories to the shared memory and processors other than a processor issuing the data read command which causes the transient state.

3. The method of claim 2, wherein a processor attempting an access to the data stored in a data entry in any one of the transient states in one of the copy-back memories retries the access in response to the retry signal after a prescribed period of time has elapsed.

4. The method of claim 1, further comprising a step of changing the cache memory state of a data entry in any one of the transient states in one of the copy-back cache memories, when the data transfer of data stored in said data entry is completed.

5. The method of claim 1, wherein the cache memory states further include the following two states:
(8) a state in which the data to be accessed exists in the copy-back cache memory of a processor other than the processor issuing the data read command, and the data does not coincide with that in the shared memory; and
(9) a transient state in which a data read command is generated for the data stored in a data entry in the state (8), and the transfer of the data is awaited.

6. A tightly coupled multi-processor system, comprising:
a plurality of processors, each processor including:
a copy-back for data storage, each data entry of the copy-back cache memory being labelled by one of plural cache memory states including the following seven states:
(1) a state in which the data to be accessed is invalid;
(2) a state in which the data to be accessed does not exist in the copy-back cache memory of a different processor, and the data coincides with that in the shared memory;
(3) a state in which the data to be accessed does not exist in the copy-back cache memory of a different processor, and the data does not coincide with that in the shared memory;
(4) a state in which the data to be accessed exists in the copy-back cache memory of a different processor, and the data coincides with that in the shared memory;
(5) a transient state in which a data read command is generated for the data stored in a data entry in the state (2), and the transfer of the data is awaited;
(6) a transient state in which a data read command is generated for the data stored in a data entry in the state (3), and the transfer of the data is awaited; and
(7a transient state in which a data read command is generated for the data stored in a data entry in the state (4), and the transfer of the data is awaited; and
means for managing the data in the copy-black cache memory by using a cache memory states, which prohibits an access to data stored in a date entry in any one of the transient states in the copy-back cache memory, by any one of said plurality of processors other than a processor issuing the data read command which causes the transient state;
a shared memory for storing the data to be accessed by said plurality of processors; and
a split transfer system bus for connecting said plurality of processors.

7. The system of claim 6, wherein each processor further includes means for transmitting a retry signal to indicate a prohibition of an access to data stored in a data entry in any one of the transient states in the copy-back cache memory, to the shared memory and other processors.

8. The system of claim 7, wherein a processor attempting an access to the data stored in a data entry in any one of the transient states in the copy-back cache memory returns the access in response to the retry signal after a prescribed period of time has elapsed.

9. The system of claim 8, wherein each processor further includes means for changing the cache memory state of a data entry in any one of the transient states in the copy-back cache memory, when the data transfer of data stored in said data entry is completed.

10. The system of claim 6, wherein the cache memory states further include the following two states:
(8) a state in which the data to be accessed exists in the copy-back cache memory of a processor other than the processor issuing the data read command, and the data does not coincide with that in the shared memory; and
(9) a transient state in which a data read command is generated for the data stored in a data entry in the state (8), and the transfer of the data is awaited.

* * * * *

UNITED STATES PATENT AND TRADEMARK OFFICE
CERTIFICATE OF CORRECTION

PATENT NO. : 5,274,787
DATED : December 28, 1993
INVENTOR(S) : Masanori Hirano, et. al.

It is certified that error appears in the above-indentified patent and that said Letters Patent is hereby corrected as shown below:

Item [57],

TITLE PAGE:

In the abstract, column 2, second line from bottom "that" should be --than--.

Column 9, claim 6, line 65, after "a copy-back" insert --cache memory--.

Column 10, claim 6, line 29, "copy-black" should be --copy-back--;

line 30, delete "a".

UNITED STATES PATENT AND TRADEMARK OFFICE
CERTIFICATE OF CORRECTION

PATENT NO. : 5,274,787
DATED : December 28, 1993
INVENTOR(S) : Masanori Hirano, et. al.

It is certified that error appears in the above-indentified patent and that said Letters Patent is hereby corrected as shown below:

Column 10, claim 8, line 49, "returns" should be --retries--.

Signed and Sealed this

Twenty-eighth Day of June, 1994

Attest:

BRUCE LEHMAN

Attesting Officer    Commissioner of Patents and Trademarks